Patented Nov. 30, 1926.

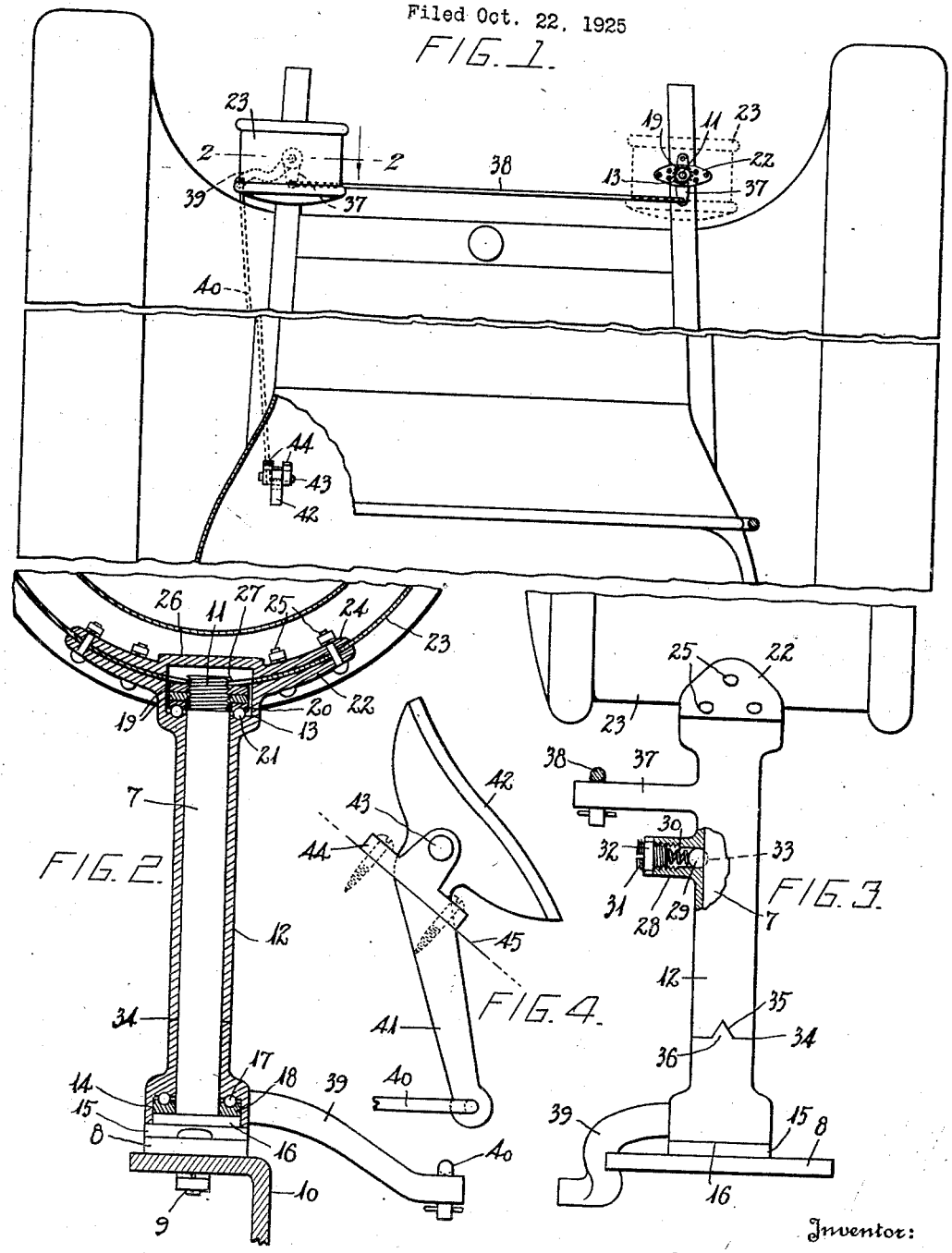

1,608,815

UNITED STATES PATENT OFFICE.

JUAN PEDRO RODRIGUEZ, OF SOUTH PALM BEACH, FLORIDA.

DIRIGIBLE HEADLAMP.

Application filed October 22, 1925. Serial No. 64,149.

The present invention relates to dirigible headlamps for automobiles or motor vehicles, and the object of the invention is to provide novel means for mounting the headlamps for turning movement in order that the beams of light may be directed to either side so as to facilitate making turns in the darkness and to avoid "blinding" the driver of an approaching vehicle, the present invention being an improvement over the dirigible headlamps disclosed in my copending application Serial No. 22,275 filed April 11, 1925.

Another object is the provision of a novel rotatable lamp mounting which will accommodate the ordinary or usual headlamp, and which will exclude moisture, dust and dirt from the bearings.

A further object is to provide such a lamp mounting which may be cut down or reduced in height so as to be capable of use on different automobiles or motor vehicles.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a fragmentary plan view of an automobile showing the improved lamp mountings installed, one lamp being shown in dotted lines.

Fig. 2 is an enlarged vertical section on the line 2—2 of Fig. 1 illustrating one of the lamp mountings, portions being shown in elevation.

Fig. 3 is a side elevation of the lamp mounting shown in Fig. 2, portions being shown in section.

Fig. 4 is a side elevation of the operating lever or pedal.

The mounting or support for each headlamp includes an upstanding spindle 7 having a base 8 secured by bolts 9 or otherwise, on the corresponding side beam or member 10 of the chassis. A flat base 8 as shown in the drawing may be used for most automobiles, but the base may be of any special shape necessary in applying the spindle to different vehicles.

A vertical sleeve 12 is fitted for rotation on the spindle and has the recesses or sockets 13 and 14 in its upper and lower ends, respectively. The base 8 has a boss thereon from which the spindle 7 rises, and the lower end of the sleeve 12 abuts the boss 15, said boss 15 having an annular rabbet 16 receiving the lower end of the sleeve to provide a snug fit which will keep out dust, dirt and moisture. Antifriction balls 17 are disposed in the recess 14 between the sleeve 12 and a washer or collar 18 disposed on the spindle 7 and seating on the boss 15, thereby providing a thrust bearing supporting the sleeve 12 for free turning movement on the spindle.

Nuts 19 are screw-threaded on the upper terminal of the spindle, to hold the sleeve 12 down on the spindle, and a collar or washer 20 is disposed on the spindle within the recess 13 below the nuts 19 to serve as a ball race for anti-friction balls 21 disposed between said collar 20 and the bottom of the recess 13, thereby providing a thrust bearing for the upper end of the sleeve 12 and spindle 7. The nuts 19 are located within the recess 13 and when tightened will hold the sleeve 12 firmly down on the base of the spindle.

The upper end of the sleeve 12 is formed with flanges 22 that are curved so as to fit the bottom of the lamp casing 23 on the exterior, and a clamping plate 24 complements the flanges 22 and fits the lamp casing 23 on the interior above the flanges 22. Clamping bolts 25 extend through apertures in the flanges 22, casing 23 and plate 24, to clamp said casing between said flanges and plate, thereby conveniently and effectively securing the lamp casing on the sleeve 12. The plate 24 is formed with a raised portion or cap 26 disposed over the opening 27 in the bottom of the lamp casing 23, which opening is provided in the lamp casing to permit the collar 20 and nuts 19 to be applied to the spindle 7. Thus, the cap 26 will exclude dust, dirt and moisture from the recess 13 and upper ends of the sleeve 12 and spindle 7.

The sleeve 12 is provided, preferably at the rear thereof, with an outstanding boss 28 having an opening in which is disposed a ball 29, and a coiled spring 30 is confined between said ball and an adjusting screw 31 threaded into said boss, a lock nut 32 being threaded on the screw to seat against the boss 28 and hold said screw in its adjusted position. The spindle 7 has a recess or notch 33 to receive the ball 29 when the sleeve 12 is turned to adjust the lamp to its straight-forward or neutral position. This will prevent the lamp from turning accidentally, although it may be turned with the sleeve 12, in which event the ball 29 is forced out of the notch 33 against the spring 30, said spring holding the ball 29 under pressure against the spindle 7 so that the friction will hold the lamp in any position to which it is turned. When the lamp is returned to straight-forward or intermediate position the ball 29 snaps into the notch 33, thereby facilitating the return of the lamp after it is turned in either direction from normal position. The screw 31 may be adjusted to regulate the pressure of the spring 30.

It is preferable to supply the spindle 7 and sleeve 12 in a maximum length, in order that the lengths thereof may be reduced according to the wishes of the user or the demands in installing the devices on different automobiles. The spindle 7 may be readily cut down or sawed off to the desired height, and the upper terminal thereof screw-threaded to receive the nuts 19. To shorten the sleeve 12 an intermediate section thereof is cut or sawed out, and the adjacent ends of the upper and lower sections abut, as at 34, and are formed with interengaging portions so that the upper and lower sections turn one with the other. Thus, as shown, the upper section has notches 35 in its lower end, and the lower section has teeth or lugs 36 to enter the notches 35. Thus, by cutting down or reducing the length of the spindle, and by cutting out or removing an intermediate portion of the sleeve, the mounting or support may be reduced in height, without requiring different castings, thereby affording economy in manufacture. Thus, the same spindle and sleeve may be used for different automobiles or for different heights of mountings or supports.

The sleeves 12 have arms 37, which preferably extend rearwardly, in order to connect the two headlamps of an automobile, and a link or rod 38 is connected to the arms 37 so that both lamps turn simultaneously. One sleeve 12 has an outstanding arm 39 connected by a rod or link 40 with a foot lever 41 having a foot piece or pedal 42, and said lever 41 is fulcrumed, as at 43, on bearings 44 secured by bolts or screws on the foot board 45 of the vehicle. The foot piece 42 is of the form of a compound curve, in order that the shoe may be readily slid up and down on said foot piece for swinging the lever 41 forwardly and rearwardly, when turning the lamps.

When the lower end of the foot piece 42 is pushed down, the lever 41 is swung forwardly, thereby turning the lamps toward the right, for lighting up the right hand side of the road, or moving the beams of light away from an approaching vehicle in order to prevent glare which may "blind" the driver of the approaching vehicle. When the upper end of the foot piece 42 is pushed down, then the lamps are turned toward the left, which may be used when making a turn to the left for lighting up the left hand side of the road. When the lamps are turned toward either side they may be readily returned to normal position, and the balls 29 snapping into the notches 33 of the spindles 7 will hold the lamps in straight-forward position.

Having thus described the invention, what is claimed as new is:—

1. A device of the character described comprising a spindle, a sleeve rotatable thereon, removable securing means on one terminal of the spindle for holding the sleeve on said spindle, a lamp casing having an opening registering with the corresponding end of the sleeve, and means carried by the sleeve securing the casing thereto and having a cap extending across and closing said opening and end of the sleeve and concealing said spindle and securing means from the interior of the lamp casing.

2. A device of the character described comprising a spindle, a sleeve rotatable thereon and having an outstanding portion at one end, securing means on the corresponding terminal of the spindle to hold the sleeve on the spindle, a lamp casing seating against said portion and having an opening registering with said end of the sleeve, and a plate within the lamp casing secured to said portion and having a cap extending across said opening and end of the sleeve and concealing said spindle and securing means from the interior of the lamp casing.

3. A device of the character described comprising a spindle, a sleeve rotatable thereon and having a recess at one end and a flange at said end, means in said recess engaging the spindle to hold the sleeve on the spindle, a lamp casing seating against said flange and having an opening registering with said recess, and a plate within the casing secured to said flange to secure the lamp casing to the flange, said plate having a cap extending across said opening and recess.

4. A device of the character described comprising a spindle, a sleeve mounted for turning movement on the spindle and having a recess at one end and a flange at said end to accommodate a lamp casing, means in said recess engaging the spindle to hold the sleeve thereon, and a plate complementing said flange to clamp the lamp casing between said flange and plate, the plate having a cap to extend across said recess.

5. A device of the character described comprising a spindle having a base, a sleeve mounted for turning movement on the spindle and having recesses in its ends, means on the terminal of the spindle opposite to the base for holding the sleeve on the spindle, one end of the sleeve fitting the base, the other end of the sleeve having means for the attachment of a lamp casing, and anti-friction bearings in said recesses between the sleeve and firstnamed means and between the sleeve and base.

6. A device of the character described comprising an upstanding spindle having a base, a sleeve mounted for turning movement on the spindle and having recesses in its upper and lower ends, the lower end of the sleeve fitting the base, an anti-friction bearing in the lower recess between the sleeve and base, means on the upper terminal of the spindle for holding the sleeve thereon, an anti-friction bearing between said means and sleeve, and means carried by the upper end of the sleeve for the attachment of a lamp casing.

In testimony whereof I hereunto affix my signature.

JUAN PEDRO RODRIGUEZ.